US008347356B2

(12) United States Patent
James et al.

(10) Patent No.: US 8,347,356 B2
(45) Date of Patent: *Jan. 1, 2013

(54) ADAPTIVE HTTP AUTHENTICATION SCHEME SELECTION

(75) Inventors: Richard Keith James, Redmond, WA (US); Jonathan Silvera, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

This patent is subject to a terminal disclaimer.

(21) Appl. No.: 12/415,817

(22) Filed: Mar. 31, 2009

(65) Prior Publication Data

US 2010/0251345 A1 Sep. 30, 2010

(51) Int. Cl.
*G06F 7/04* (2006.01)
(52) U.S. Cl. .......................................... 726/3; 713/160
(58) Field of Classification Search ................. 726/3, 4,
726/5, 6; 713/168, 160, 161; 709/203, 227,
709/229
See application file for complete search history.

(56) References Cited

U.S. PATENT DOCUMENTS

| | | | |
|---|---|---|---|
| 6,216,101 B1 | 4/2001 | Butts et al. | |
| 6,961,772 B1 | 11/2005 | Wensel | |
| 7,191,467 B1 | 3/2007 | Dujari et al. | |
| 7,194,763 B2 | 3/2007 | Potter | |
| 7,243,370 B2 | 7/2007 | Bobde et al. | |
| 7,281,139 B2 | 10/2007 | Stewart | |
| 7,398,546 B2 | 7/2008 | Chen | |
| 7,421,503 B1 | 9/2008 | Stieglitz | |
| 2003/0226036 A1 | 12/2003 | Bivens et al. | |
| 2004/0128506 A1 | 7/2004 | Blakley, III et al. | |
| 2006/0021004 A1 | 1/2006 | Moran et al. | |
| 2006/0185021 A1* | 8/2006 | Dujari et al. | 726/27 |
| 2007/0143834 A1* | 6/2007 | Leinonen et al. | 726/5 |
| 2008/0301784 A1 | 12/2008 | Zhu et al. | |
| 2009/0106433 A1 | 4/2009 | Knouse et al. | |

OTHER PUBLICATIONS

Atif Aziz and Scott Michell, Supporting HTTP Authentication and Forms Authentication in a single ASP. NET Web Site; Apr. 2006, pp. 1-21; Retrieved Date Oct. 20, 2011.*
Eric Glass, The NTLM Authentication Protocol and Security Support Provide; 2003, 2006; Retrieved Date Oct. 20, 2011.*
J. Franks, HTTP Authentication: Basic and Digest Access Authentication RFC 2617; Jun. 1999; Retrieved Date Oct. 20, 2011.*
"Authentication with Multiple Known Headers," accessed at http://msdn.microsoft.com/en-us/library/aa814328(VS.85). aspx; on Jan. 2, 2009, pp. 1-2.
"HTTP Authentication with PHP & htpasswd," accessed at http://koivi.com/php-http-auth/; on Jan. 2, 2009, pp. 1-2.

(Continued)

*Primary Examiner* — Samson Lemma
(74) *Attorney, Agent, or Firm* — Merchant & Gould, P.C.

(57) ABSTRACT

A method is presented for selecting an HTTP authentication scheme at a client computer. A request message is sent from the client computer to a server computer to access information on the server computer. In response, the client computer receives a response message from the server computer. The response message includes an HTTP header that includes a first scheme identifier, indicating a first HTTP authentication scheme and a second scheme identifier, indicating a second HTTP authentication scheme. If the client computer does not support the second HTTP authentication scheme, the client computer uses the first HTTP authentication scheme when sending another HTTP message to the server computer. If the client computer supports the second HTTP authentication scheme, the client computer uses the second HTTP authentication scheme when sending another HTTP message to the server computer.

18 Claims, 10 Drawing Sheets

Client-Initiated Authentication

OTHER PUBLICATIONS

"Http WebRequest and Authentication—Part 1," © 2008, accessed at http://blogs.msdn.com/joncole/archive/2005/11/09/491009.aspx, on Jan. 2, 2009, pp. 1-2.

"SPNEGO-Based Kerberos and NTLM HTTP Authentication in Microsoft Windows," accessed at http://community.roxen.com/develpers/idocs/rfc/rfc4559.html, on Jan. 2, 2009, pp. 1-5.

"Using HTTP Authentication with PHP," accessed at http://programmerassist.com/article/321, on Jan. 2, 2009, pp. 1-3.

MS-N2HT, Negotiate and Nego2 HTTP Authentication Protocol, copyright © 2009 Microsoft Corporation, Jan. 14, 2009, 14 pages.

MS-N2HT, Negotiate and Nego2 HTTP Authentication Protocol, copyright © 2009 Microsoft Corporation, Feb. 23, 2009, 14 pages.

MS-SPNG, Simple and Protected Generic Security Service Application Program Interface Negotiation Mechanism (SPNEGO) Protocol Extensions, copyright © 2009 Microsoft Corporation, 23 pages.

U.S. Appl. No. 12/415,790, Non-Final Office Action mailed Oct. 13, 2011, 15 pages.

U.S. Appl. No. 12/415,790, Amendment & Response to Non-Final Office Action dated Jan. 13, 2012, 15 pages.

D. Cotroneo, A. Mazzeo, L. Romano, S. Russo, *Integration of Legacy Client-Server Applications in a Secure Multi-Tier Architecture*, Proceedings of the $10^{th}$ Euromicro Workshop on Parallel, Distributed and Network—based Processing ( EUROMICRO-PDP '02), http://ieeexplore.ieee.org/stamp/stamp.jsp?arnumber=00994289, 8 pages.

Eric Glass, *The NTLM Authentication Protocol and Security Support Provider*, SourceForge.Net, eric.glass@gmail.com, Copyright © 2003, 2006 Eric Glass, http://davenport.sourceforge.net/ntlm.html, 127 pages.

Yasuhiko Matsunaga, Ana Sanz Merino, Takashi Suzuki, and Randy Katz, *Secure Authentication System for Public WLAN Roaming*, WMASH '03, Sep. 19, 2003, San Diego, California, USA. Copyright 2003 ACM 1-58113-768-0/03/0009, http://sahara.cs.berkeley.edu/papers/PWANAUTH.pdf, 10 pages.

U.S. Appl. No. 12/415,790, Notice of Allowance and Fee(s) Due mailed Mar. 29, 2012, 13 pages.

\* cited by examiner

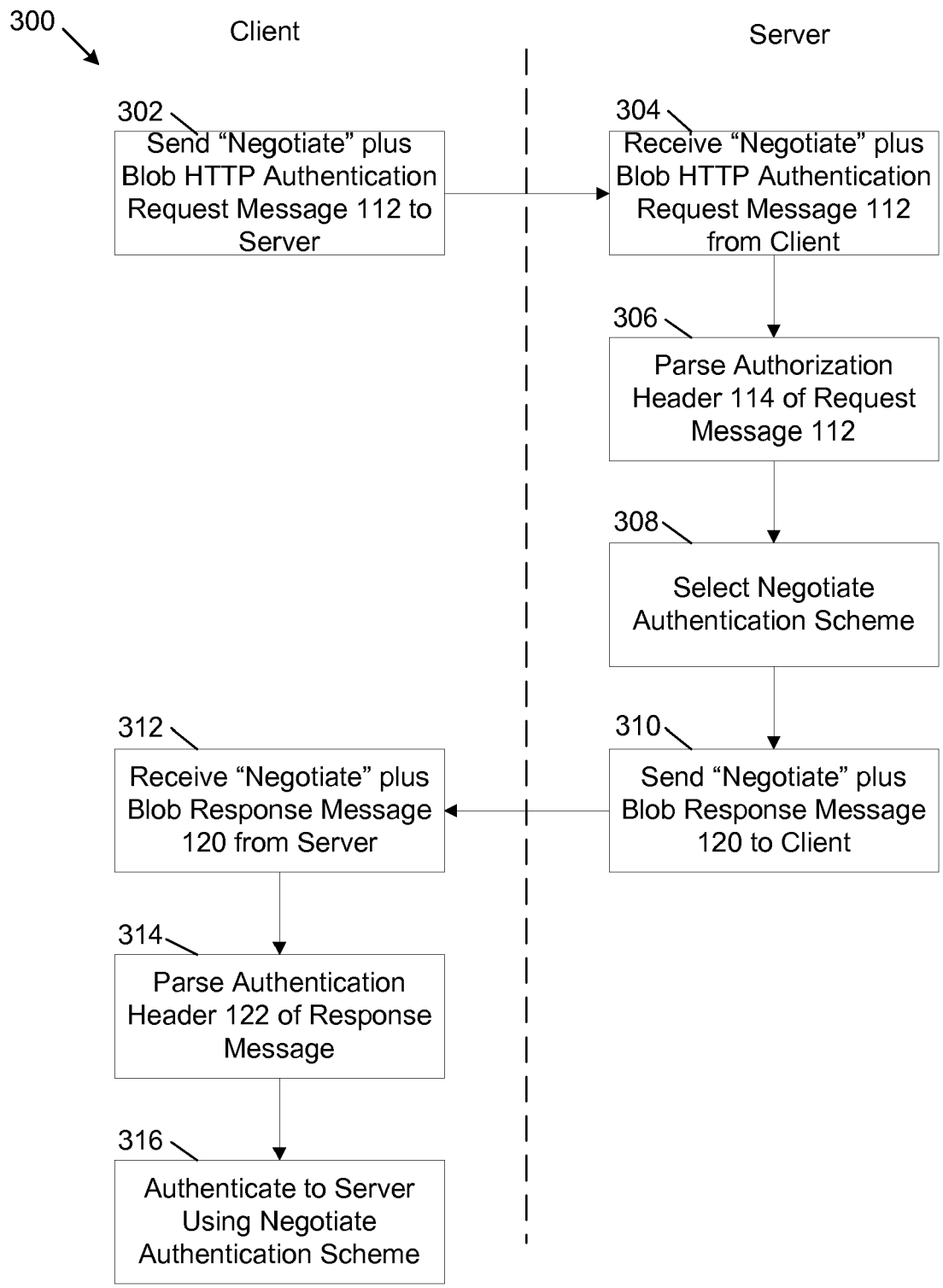

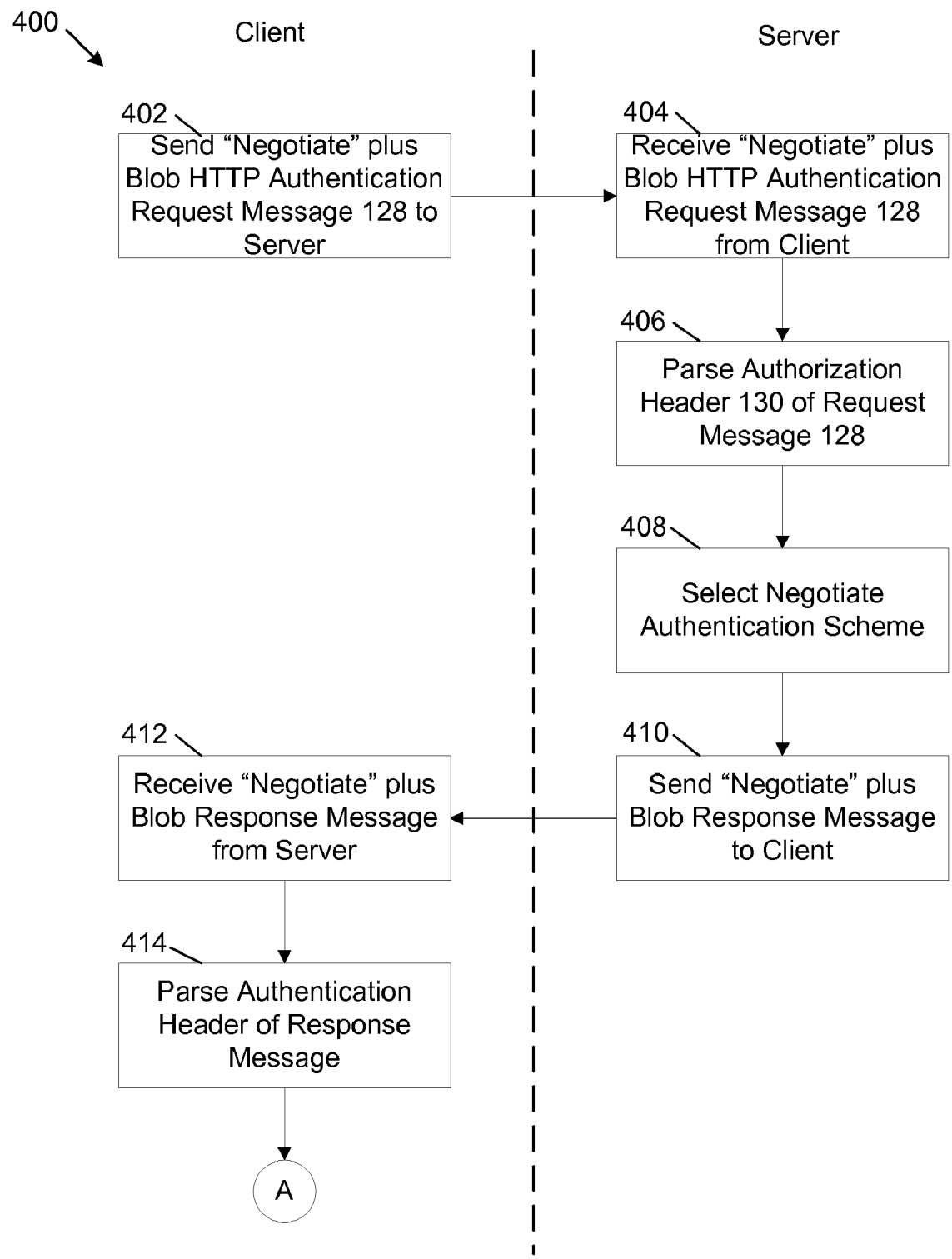
FIG. 4A — Client-Initiated Authentication

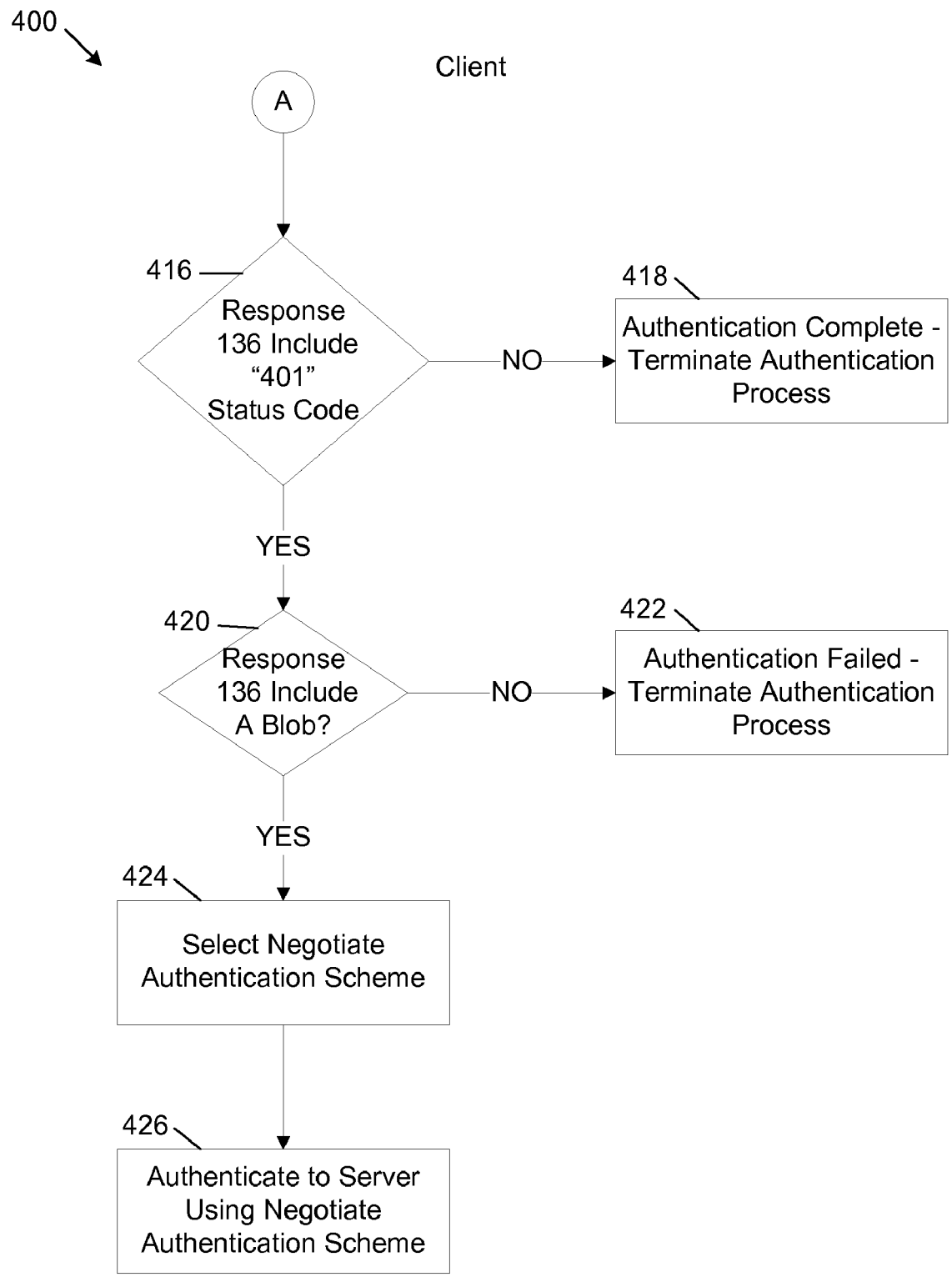
FIG. 4B — Client-Initiated Authentication

Server-Initiated Authentication – From Client 102's Perspective

ADAPTIVE HTTP AUTHENTICATION SCHEME SELECTION

BACKGROUND

Various HTTP authentication schemes have been developed to permit Internet applications such as web browsers to validate credentials at web servers. The HTTP authentication schemes provide a means for clients and servers to identify a common authentication protocol that they both support and to identify the type of credentials needed for server access.

The HTTP authentication schemes are commonly used within an HTTP authentication mechanism that provides a framework for the HTTP authentication schemes. One commonly used HTTP authentication mechanism is the Simple and Protected Negotiation (SPNEGO) mechanism. SPNEGO enables client computers to determine whether their credentials are supported on the server computer they wish to access. SPNEGO supports the Negotiate HTTP authentication scheme. However, the Negotiate HTTP authentication scheme supports a limited number of authentication protocols and limits the type of credentials that may be used for authentication.

Newer HTTP authentication schemes now exist that provide for additional authentication protocols and capabilities. However, not all clients and servers support the newer authentication schemes. Further, clients and servers that support the newer schemes often are not aware of what scheme is supported when they initiate HTTP authentication.

SUMMARY

Embodiments of the disclosure are directed to adaptively selecting an HTTP authentication scheme. A first request message is sent from a client computer to access information on a server computer. In response to the first request message, the client computer receives an HTTP authentication response message from the server computer. The response message includes scheme identifiers for a first HTTP authentication scheme and a second, newer HTTP authentication scheme. A determination is made whether the client computer supports the second, newer HTTP authentication scheme. In response to determining that the client computer does not support the second, newer HTTP authentication scheme, the client computer selects the first HTTP authentication scheme. The client computer uses the first HTTP authentication scheme when sending another HTTP message from the client computer to the server computer.

In response to determining that the client computer does support the second, newer HTTP authentication scheme, the client computer selects the second HTTP authentication scheme. The client computer uses the second HTTP authentication scheme when sending another HTTP message from the client computer to the server computer.

The details of one or more techniques are set forth in the accompanying drawings and the description below. Other features, objects, and advantages of these techniques will be apparent from the description, drawings, and claims.

DESCRIPTION OF THE DRAWINGS

FIG. 3 shows a flow chart illustrating an example of client-initiated authentication, where a client which supports the Negotiate authentication scheme, but does not support the Nego2 authentication scheme, initiates an HTTP authentication process with a server, which likewise supports the Negotiate authentication scheme, but not the "Nego2" authentication scheme.

FIGS. 4A and 4B show a flow chart illustrating an example of client-initiated authentication, where client which supports the Nego2 authentication scheme, initiates an HTTP authentication process a with server which does not.

DETAILED DESCRIPTION

Figure 1:
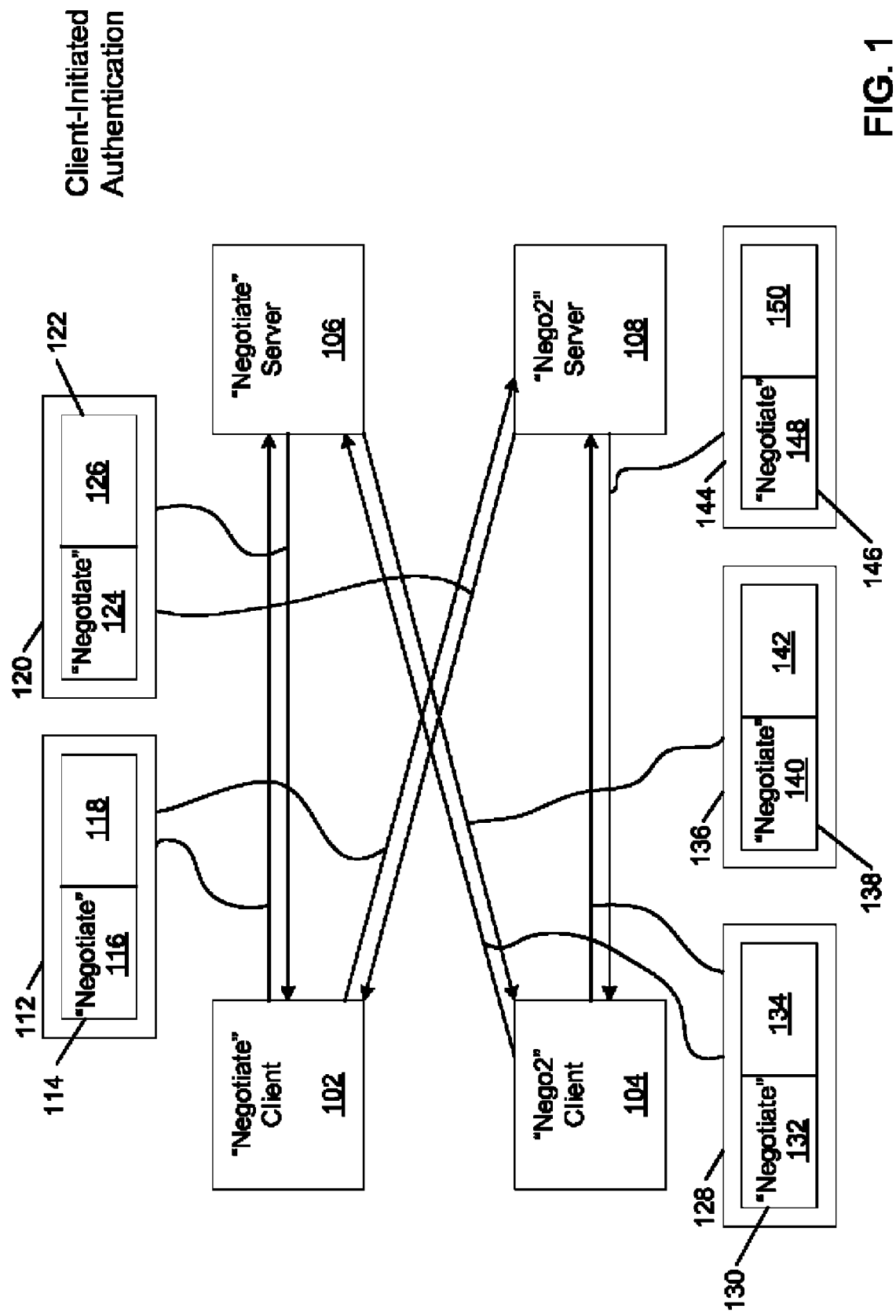
FIG. 1 shows an example system for adaptively selecting an HTTP authentication scheme for client-initiated authentication.

The present disclosure is directed to systems and methods for adaptively selecting an HTTP authentication scheme that permits newer and advanced methods of authentication to be used and yet maintains compatibility with legacy authentication schemes. For example, a new HTTP authentication scheme, the Nego2 HTTP authentication scheme, is disclosed that is used in conjunction with The Simple and Protected Negotiation (SPNEGO) authentication mechanism. In addition, methods are disclosed that ensure interoperability between clients and servers with different versions of authentication software installed. Furthermore, if a client and server both support the Nego2 HTTP authentication scheme, when the server initiates the authentication process the Nego2 HTTP authentication scheme is used.

The SPNEGO authentication mechanism (disclosed in Internet Engineering Task Force IETF RFC 4178) provides a framework that ensures that client and server support a common security mechanism. SPNEGO supports the Negotiate HTTP authentication scheme. In the Negotiate HTTP authentication scheme, the entity that initiates the authentication scheme, either client or server, proposes a list of security mechanisms—typically a list of authentication protocols. The list is typically proposed in decreasing order of preference, the favorite choice first. The entity that receives the list either accepts the initiator's preferred mechanism or proposes another security mechanism from the list. HTTP authentication messages are exchanged between client and server until a security mechanism is agreed upon.

The implementation of SPNEGO on a client or server may limit the security mechanisms that may be selected. For example, an implementation of SPNEGO for Microsoft Windows (disclosed in RFC 4559), limits SPNEGO to the Kerberos and NTLM (Microsoft NT LAN Manager) authentication protocols. Other implementations of SPNEGO may have similar limitations.

As technology develops, new authentication protocols become available. For example, newer versions of Microsoft Windows may desire to authenticate with Live ID for a Hotmail account or may wish to use a Federated type of authentication scheme. Instead of obtaining authentication credentials from a dedicated database (for example from Microsoft Active Directory), a user may wish to obtain authentication credentials from an online source, for example from Microsoft Office Live or from a Microsoft Sharepoint server. Other sources of authentication credentials are possible.

An example of an HTTP authentication scheme that supports newer authentication protocols and newer methods of using authentication credentials is Nego2 from Microsoft Corporation of Redmond, Wash. Nego2, an extension of SPNEGO, supports newer authentication mechanisms, for example Live ID and Federated authentication schemes, but also supports compatibility with legacy HTTP authentication schemes like Negotiate. With Nego2, an HTTP authentication scheme can be adaptively selected in-band during interactions between client and Server.

Figure 2:
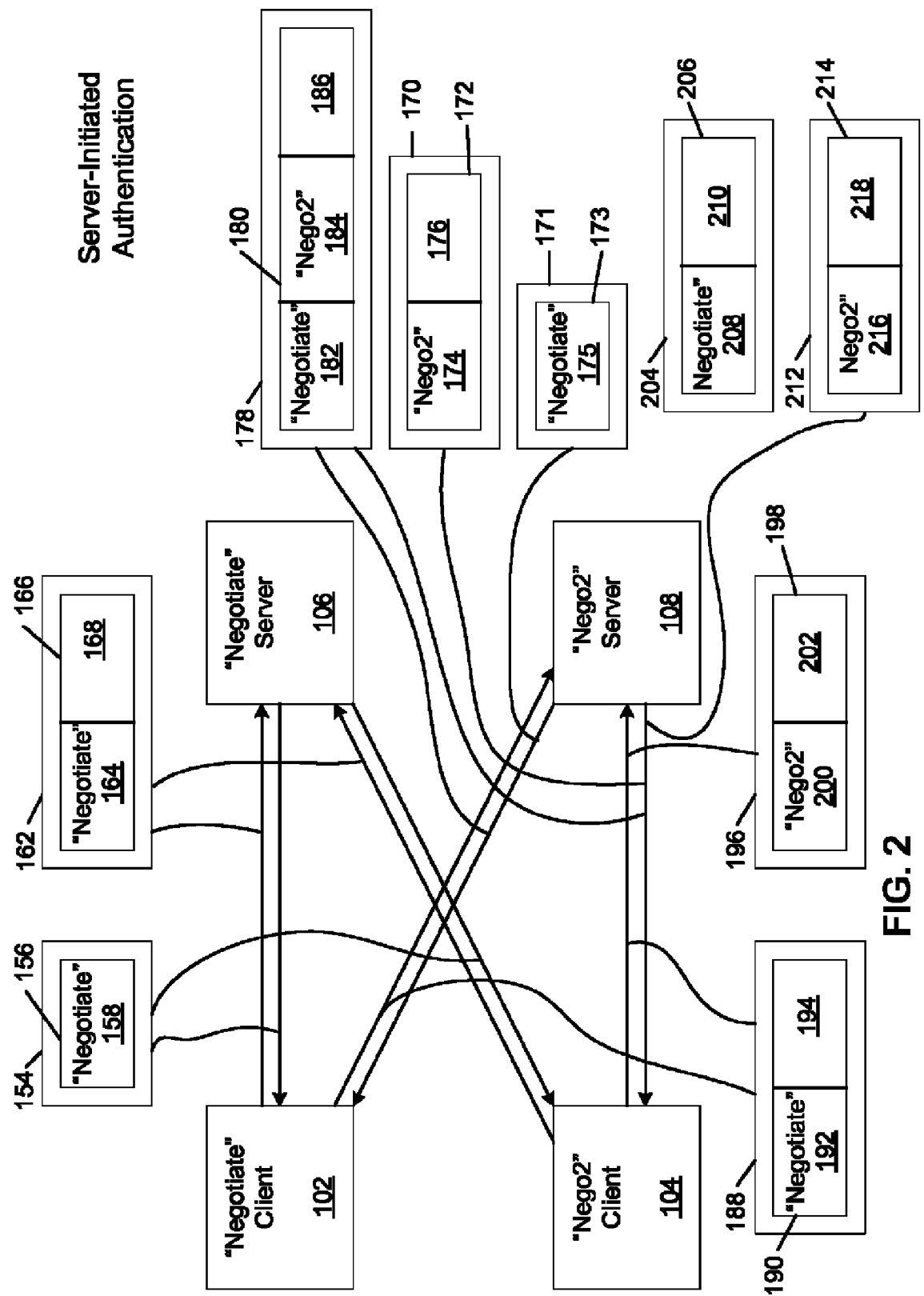
FIG. 2 shows an example system for adaptively selecting an HTTP authentication scheme for server-initiated authentication.

FIGS. 1 and 2 show an example system 100 for adaptively selecting an HTTP authentication scheme. The example system 100 includes clients 102 and 104 and servers 106 and 108. Greater or fewer clients, servers and networks can be used. Clients and servers may be installed with different levels of software, the different levels of software having different HTTP authentication schemes.

In FIGS. 1 and 2, clients 102 and 104 are computing devices, such as desktop computers, laptop computers, terminal computers, personal data assistants, or cellular telephone devices. An example computing device is described below with reference to FIG. 10. Clients 102 and 104 can include input/output devices, a central processing unit ("CPU"), a data storage device, and a network device. In the present disclosure, the terms client and client computer are used interchangeably. Client 102 supports a first authentication scheme, such as the Negotiate HTTP authentication scheme, but not a second, newer authentication scheme, such as the Nego2 authentication scheme. Client 104 supports both the first and second authentications schemes, such as the Negotiate HTTP and Nego2 authentication schemes.

Servers 106 and 108 are computing devices and are accessible to clients 102 and 104. Servers 106 and 108 can include input/output devices, a central processing unit ("CPU"), a data storage device, and a network device. In example embodiments, clients 102 and 104 can access servers 106 and 108 and resources connected to servers 106 and 108. In example embodiments, servers 106 and 108 are web servers. In the present disclosure, the terms "server" and "server computer" refer to a computing device that acts like a server. Server 106 supports a first authentication scheme, such as the Negotiate HTTP authentication scheme, but not a second, newer authentication scheme, such as the Nego2 authentication scheme. Server 108 supports both the first and second authentications schemes, such as the Negotiate HTTP and Nego2 authentication schemes.

Either a client or a server can initiate HTTP authentication, depending on the context of the software application being run. Typically, the initiating entity sends an HTTP authentication request message with an HTTP header to the accepting entity. The accepting entity typically replies with an HTTP response message that includes an HTTP header. In this disclosure, clients send HTTP authentication messages with an HTTP authorization header and servers send HTTP authentication messages with an HTTP authentication header. Other embodiments are possible.

The HTTP authorization header and HTTP authentication header are specific types of HTTP headers. An HTTP authorization header may contain an Authorization request header field. An HTTP authentication header may contain a "WWW-Authenticate" response header field. Examples of HTTP header field types, including HTTP authorization headers and HTTP authentication headers, can be found in RFC 2616 (Hypertext Transfer Protocol/HTTP 1.1).

HTTP authentication messages include an HTTP header. The HTTP header includes a scheme identifier that indicates a proposed authentication scheme followed by an optional data block containing authentication data. The data block, for example a string of data, also known as a binary large object (i.e. a blob), contains SPNEGO protocol information, as specified in RFC 4178. The blob includes authentication policy information and may also contain additional information such as the identifiers of authentication protocols that are supported by the sending entity. The blob is an example of a security token, specified in GSS-API format per RFC 2743.

Client-Initiated Authentication

A client may initiate the authentication process, for example, if the client sends a request to a website the client knows requires authentication. If a client initiates HTTP authentication, the client sends an HTTP authentication request message to a server with an HTTP authorization header containing a scheme identifier. When the server receives the HTTP authentication request message, the server parses the HTTP authorization header of the HTTP authentication message, identifies the scheme identifier, and processes the blob to identify authentication protocols that the client supports. When the server processes the blob, the server uses server software that is not part of the HTTP authentication software, typically, one of the layers in the server software protocol stack. As such, the blob processing is transparent to the HTTP authentication software installed on the server. In response to receiving the HTTP authentication message from the client, the server sends a response message to the client. According to protocol rules, the server's response message includes an HTTP authentication header containing a scheme identifier followed by a blob. Also according to protocol rules, the server must use the same scheme identifier in the response message that the client included in the request message.

FIG. 1 shows the messages sent between clients 102 and 104 and servers 106 and 108 when clients 102 and 104 initiate HTTP authentication.

FIG. 3 shows a flow chart illustrating an example where client 102, which supports the Negotiate authentication scheme, but does not support the Nego2 authentication scheme, initiates an HTTP authentication process 300 with server 106, which likewise supports the Negotiate authentication scheme, but not the "Nego2" authentication scheme. At operation 302, client 102 sends HTTP authentication request message 112 (shown in FIG. 1) to server 106 to retrieve, for example, web pages from a website hosted by server 106. Authentication request message 112 contains authorization header 114 which contains scheme identifier 116 and blob 118. Because client 102 has code that supports Negotiate, client 102 includes scheme identifier 116 stating "Negotiate" in authorization header 114. When the client 102 sends authentication request message 112, client 102 typically has no knowledge of the level of HTTP authentication software installed on server 106.

At operation 304, server 106 receives the authentication request message 112 from client 102. When server 106 receives the authentication message 112 it typically does not know which HTTP authentication schemes are supported by client 102.

At operation 306, server 106 parses authorization header 114 of authentication message 112, identifies the "Negotiate" scheme identifier 116, and processes blob 118 to identify which authentication protocols that client 102 supports.

As mentioned above, server 106 supports the Negotiate authentication scheme. At operation 308, server 106 selects the Negotiate authentication scheme because this scheme is supported by both client 102 and server 106. Server 106 makes the determination to select the Negotiate authentication scheme because the client included the scheme identifier "Negotiate" in the request message 112.

At operation 310, server 106 replies to client 102 with an HTTP authentication response message 120 (shown in FIG. 1) that contains an HTTP authentication header 122, including a scheme identifier 124 stating "Negotiate," and a blob 126. Blob 126 includes the identifiers of authentication protocols that server 106 supports and suggests to client 102. Because server 106 supports the Negotiate authentication scheme, server 106 typically suggests Kerberos or NTLM to client 102.

At operation 312, client 102 receives authentication response message 120.

At operation 314, client 102 parses authentication header 122 of authentication response message 120, identifies the "Negotiate" scheme identifier 124, and processes blob 126. Because client 102 supports "Negotiate," and because the "Negotiate" scheme identifier confirms that server 106 supports the Negotiate HTTP authentication scheme, at operation 316 client 102 authenticates to server 106 using the Negotiate HTTP authentication scheme.

The same HTTP authentication process 300 shown in FIG. 3 is used if client 102 initiates an HTTP authentication process 300 with a server which supports the Nego2 authentication scheme, such as server 108. In this example, at operation 302, client 102 sends the same HTTP authentication request message 112 (shown in FIG. 1) to server 108 that it would send to server 106. Client 102 sends the same request message to servers 106 and 108 because client 102 does not know what authentication schemes are supported by a server when it makes this type of request.

Likewise, as a result of parsing the authorization header 114 of request message 112 at operation 306, server 108 determines that client 102 supports the Negotiate authentication scheme. Therefore, at operation 308, server 108 selects the Negotiate authentication scheme because this is supported by both server 108 and client 102 and sends HTTP authentication response message 120 to client 102. Server 108 does not select Nego2 because it knows that this is not supported by client 102.

FIGS. 4A and 4B show a flow chart illustrating an example where client 104, which supports the Nego2 authentication scheme, initiates an HTTP authentication process 400 with server 106, which does not. At operation 402, client 104 sends an HTTP authentication request message 128 (shown in FIG. 1) to server 106 to retrieve, for example, web pages from a website hosted by server 106. The HTTP authentication request message 128 includes authorization header 130. The authorization header 130 includes "Negotiate" scheme identifier 132 and blob 134. Blob 134 typically includes identifiers of authentication protocols that client 104 supports, for example LiveID or Federated protocols in addition to Kerberos or NTLM.

The authorization header 130 includes the "Negotiate" scheme identifier because even though client 104 supports the Nego2 authentication scheme, client 104 does not know what authentication scheme server 106 supports. A server that does not support Nego2 will not understand a "Nego2" scheme identifier and will not process the HTTP authentication request message correctly. With respect to authentication protocols in the blob that a server may not understand, because the blob is processed outside the HTTP layer in the protocol stack, the server simply ignores a protocol that it does not support.

At operation 404, server 106 receives HTTP authentication request message 128 from client 104. At operation 406, server 106 parses the authorization header 130 of authentication request message 128 to identify "Negotiate" scheme identifier 132 and processes blob 134. As mentioned above, server 106 supports the "Negotiate" authentication scheme, but not the Nego2 authentication scheme. At operation 408, server 106 selects the Negotiate authentication scheme because authentication request message 128 includes the "Negotiate" scheme identifier.

At operation 410, server 106 sends an HTTP authentication response message 136 (shown in FIG. 1) to client 104. The response message 136 includes authentication header 138 with the scheme identifier 140 stating "Negotiate" plus blob 142. Blob 142 typically includes identifiers of authentication protocols that server 106 supports and suggests to client 104.

At operation 412, client 104 receives response message 136 from server 106. At operation 414, client 104 parses authentication header 138 to determine at operation 416 (shown in FIG. 4B) whether the authentication header 138 includes a "401 Unauthorized" status code. The "401 Unauthorized" status code indicates that further authorization is required. If authentication header 138 does not include the "401" Unauthorized status code, authentication is complete and, at operation 418, client 104 terminates the authentication process.

If the response message 136 does include the "401 Unauthorized" status code, at operation 420, client 104 makes a determination as to whether response message 136 includes a blob. The blob may include information needed for contextual prompting, such as a trusted issuer list. If response message 136 does not include a blob, at operation 422, client 104 terminates the authentication process because the lack of a blob indicates an authentication failure at server 106.

If the response message 136 includes blob 142, at operation 424, client 104 selects the Negotiate authentication scheme. Client 104 selects the Negotiate authentication scheme because authentication header 138 includes the "Negotiate" scheme identifier". At operation 426, client 104 authenticates to server 108 using the "Negotiate" authentication scheme.

The same HTTP authentication process 400 shown in FIGS. 4A and 4B is used if client 104 initiates an HTTP authentication process with a server which supports the Nego2 authentication scheme, such as server 108. Client 104 sends the same request message 128 (with a "Negotiate" scheme identifier) to server 108 because even though client 104 and server 108 support the Nego2 authentication scheme, client 104 does not know what authentication scheme server 108 supports when it sends this message. A server that does not support Nego2 will not understand a "Nego2" scheme identifier and will not process the HTTP authentication request message correctly.

As mentioned above, server 108 supports the Nego2 authentication scheme. However, protocol rules require that server 108 responds with the same scheme identifier that was included in the request message from the client. As such, at operation 408, server 108 selects the Negotiate authentication scheme because authentication request message 128 includes the "Negotiate" scheme identifier.

At operation 410, server 108 sends HTTP authentication response message 144 (shown in FIG. 1) to client 104. The response message 144 includes authentication header 146 with the scheme identifier 148 stating "Negotiate" plus blob 150.

Server-Initiated Authentication

A server may also initiate HTTP authentication. In one example, a client requests information from a server, such as a website supported by the server, and does not provide any authentication credentials with the request. If the website requires authentication credentials before providing the requested information, the server that supports the website may initiate an HTTP authentication sequence by sending a response message to the client that includes a "WWW-Authenticate" HTTP header, as specified in RFC 2616, and a "401 Unauthorized" status code. This response message indicates to the client that access to the website has been denied.

When the client receives the response message, the client parses the "WWW-Authenticate" HTTP header, identifies the scheme identifier, and processes the blob to identify authentication protocols that the server suggests and to determine the credentials that the server requires. The client processes the blob in one of the layers in the client software protocol stack, which is transparent to the HTTP authentication software installed on the client. The client uses this information to send succeeding messages to the server.

The authentication protocol that the server may suggest is typically dependent on the software applications running on the server. For example, a Live ID server may suggest a Live ID authentication protocol. In other example embodiments, the server may suggest a Federated authentication protocol or the server may suggest a specific type of Kerberos ticket.

When a server initiates HTTP authentication, the server can offer one of three selection scheme choices to a client. If the server does not know whether the client supports the Negotiate authentication scheme or the Nego2 authentication scheme, the server uses both the "Negotiate" and the "Nego2" scheme identifiers and offers both authentication schemes to the client. If the server knows that the client supports the Nego2 authentication scheme, the server uses the "Nego2" scheme identifier and offers the Nego2 authentication scheme to the client. If the server knows that the client supports the Negotiate authentication scheme but not the Nego2 authentication scheme, the server uses the "Negotiate" scheme identifier and offers the Negotiate authentication scheme to the client.

FIG. 2 shows the messages sent between servers 106 and 108 and clients 102 and 104 when servers 106 and 108 initiate HTTP authentication.

Figure 5:
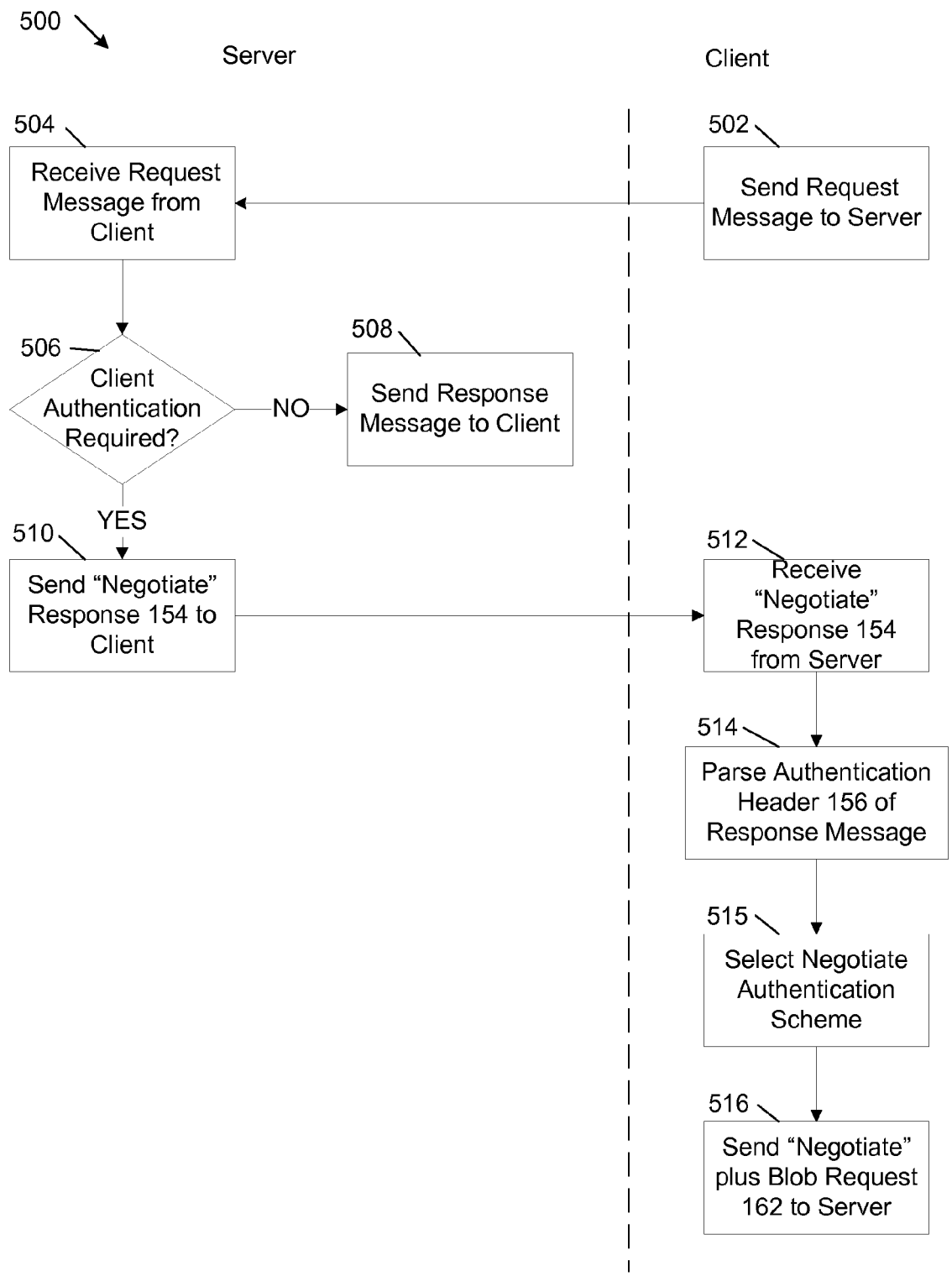
FIG. 5 shows a flow chart illustrating an example of server-initiated authentication, where a server which supports the Negotiate authentication scheme but not the Nego2 authentication scheme initiates an HTTP authentication process with a client which likewise supports the Negotiate authentication scheme but not the Nego2 authentication scheme.

FIG. 5 shows a flow chart illustrating an example where server 106, which supports the Negotiate authentication scheme but not the Nego2 authentication scheme, initiates an HTTP authentication process 500 with client 102, which likewise supports the Negotiate authentication scheme but not the Nego2 authentication scheme. Server 106 typically initiates the authentication process for the case where a client makes a request for information on server 106, the client does not include authorization credentials with the request, and server 106 determines that authorization credentials are needed from the client.

At operation 502, client 102 sends a request message (not shown in FIG. 2) to server 106 to access information on server 106. In one example, the request message may be requesting a website hosted on server 106.

At operation 504, server 106 receives request message from client 102. At operation 506, server 106 determines whether authorization is required from client 102 to access information on server 106. If server 106 determines that authorization is not required, at operation 508, server 106 responds to the request at operation 506.

However, if server 106 determines that authorization is required, server 106, at operation 510, sends an HTTP authentication response message 154 (shown in FIG. 2) to client 102 that contains an authentication header 156. The authentication header 156 contains scheme identifier 158 specifying "Negotiate" but without a blob. Server 106 selects the Negotiate authentication scheme because server 106 supports the Negotiate authentication scheme but not the Nego2 authentication scheme. The HTTP authentication request message 154 does not include a blob because when server 106 initiates authentication with the Negotiate authentication scheme, client 102 understands that only the Kerberos and NTLM authentication schemes are being offered. Because, as part of the Negotiate protocol, client 102 understands that when server 106 is initiating first using the Negotiate authentication scheme, only Kerberos and NTLM are being offered, this information does not need to be included in a blob and therefore a blob is unnecessary.

At operation 512, client 102 receives authentication response message 154 from server 106. At operation 514, client 102 parses the authentication header 156 to identify "Negotiate" authentication scheme identifier 158 and processes blob 160. At operation 515, client 102 selects the Negotiate authentication scheme because this scheme is supported both by client 102 and server 106.

At operation 516, client 102 sends an HTTP authentication request message 162 (shown in FIG. 2) to server 106. Authentication request message 162 includes authorization header 164. Authorization header 164 includes scheme identifier 166 specifying "Negotiate" and blob 168. Client 102 selects the Negotiate scheme identifier 166 because authentication response message 154 includes "Negotiate" scheme identifier 158, indicating to client 104 that server 108 is authenticating with the "Negotiate" authentication scheme. Thereafter, client 102 and server 106 use the Negotiate authentication scheme when communicating with one another.

The same HTTP authentication process 500 shown in FIG. 5 is used if server 106 initiates an HTTP authentication process with a client which supports the Nego2 authentication scheme, such as client 104.

If server 106 determines that authorization is required, server 106, at operation 510, sends the same HTTP authentication response message 154 (shown in FIG. 2) to client 104 at operation 510. At operation 515, client 104 selects scheme identifier 166 specifying "Negotiate," even though it also supports Nego2, because authentication response message 154 includes "Negotiate" scheme identifier 158, indicating to client 104 that server 108 is authenticating with the "Negotiate" authentication scheme. Thereafter, client 104 and server 106 use the Negotiate authentication scheme when communicating with one another.

Figure 6:
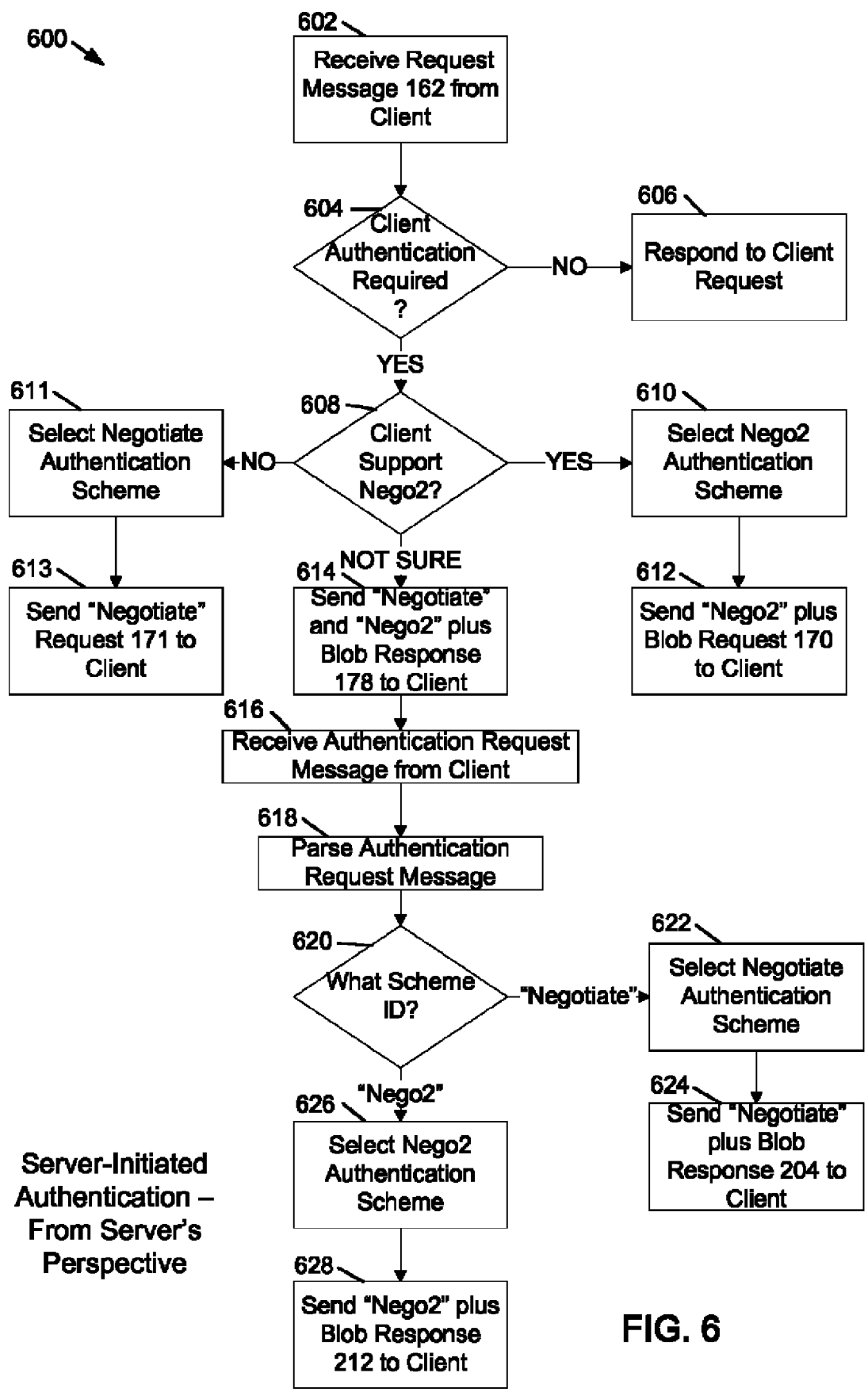
FIG. 6 shows a flow chart illustrating an example of server-initiated authentication from a server's perspective, where a server, which supports the Nego2 authentication scheme initiates an HTTP authentication process with a client.

FIG. 6 shows a flow chart illustrating an example where server 108, which supports the Nego2 authentication scheme, initiates an HTTP authentication process 600 with client 102. FIG. 6 shows the process from the perspective of server 108.

At operation 602, server 108 receives a request (not shown in FIG. 2) from client 102 to access information on server 108. For example, server 108 may receive a request to access a website hosted on server 108. At operation 604, server 108 determines whether authentication is required from client 102 to access information on server 108. If server 108 determines that authentication is not required from client 102, at operation 606 server 108 responds to the request sent by client 102.

However, if server 108 determines that authorization is required before granting access, at operation 608 server 108 determines whether client 102 supports Nego2. The determination of whether client 102 supports Nego2 determines the authentication schemes server 108 offers to client 102. For example, as discussed, server 108 can offer a client the Negotiate authentication scheme, the Nego2 authentication scheme or both authentication schemes, depending on the determination of whether server 108 knows whether the client supports Nego2. Server 108 may have a record of this specific client 102 and the authentication software client 102 supports or server 108 may not have this record. If server 108 does not know whether client 102 supports Nego2, server 108 may be able to check a remote database. For example, server 108 may check an Active Directory database determine whether client 102 supports Nego2. Active Directory is a technology created by Microsoft Corporation of Redmond, Wash., that includes directory and authentication services.

If server 108 is able to determine that client 102 supports Nego2, at operation 610 server 108 selects the Nego2 authentication scheme. After selecting the Nego2 authentication scheme, server 108, at operation 612, sends client 102 an HTTP authentication request message 170 that includes authentication header 172 with a "Nego2" scheme identifier 174 followed by a blob 176. Blob 176 includes the identifiers of authentication protocols that server 108 supports and authorization information that server 108 requires.

If server 108 is able to determine that client 102 supports Negotiate, at operation 611 server 108 selects the Negotiate authentication scheme. After selecting the Negotiate authentication scheme, server 108, at operation 613, sends client 102 an HTTP authentication request message 171 that includes authentication header 173 with a "Negotiate" scheme identifier 175 but without a blob. The HTTP authentication request message 171 does not include a blob because when server 108 initiates authentication with the Negotiate authentication scheme, client 102 understands that only the Kerberos and NTLM authentication schemes are being offered. Because, as part of the Negotiate protocol, client 102 understands that when server 108 is initiating first using the Negotiate authentication scheme, only Kerberos and NTLM are being offered, this information does not need to be included in a blob and therefore a blob is unnecessary.

If server 108 is not able to determine whether client 102 supports Nego2, at operation 614, server 108 sends client 102 an authentication response message 178 (shown in FIG. 2) that includes an authentication header 180. The authentication header 180 includes a "Negotiate" scheme identifier 182 followed by a "Nego2" scheme identifier 184 followed a blob 186. Thus, when server 108 is unable to determine whether client 102 supports the Nego2 authentication scheme, server 108 offers client 102 both the Negotiate and Nego2 authentication schemes and allows client 102 to select which one to use depending on what client 102 supports. The authentication header 180 includes the "Negotiate" scheme identifier before the "Nego2" scheme identifier because clients, such as client 102, that support the Negotiate authentication scheme but not the Nego2 authentication scheme, expect the "Negotiate" scheme identifier but may be confused by the "Nego2 scheme identifier. However, these clients typically ignore any scheme identifiers that follow the "Negotiate" scheme identifier.

At operation 616, server 108 receives authentication request message 188 (shown in FIG. 2) from client 102. Authentication request message 188 includes an authorization header 190 that includes "Negotiate" scheme identifier 192 followed by blob 194. The authorization header 190 includes the "Negotiate" scheme identifier because client 102 supports the Negotiate authentication scheme but does not support the Nego2 authentication scheme.

At operation 618, server 108 parses the authorization header 190 of authentication request message 188 to determine, at operation 620, what scheme identifier is included. If authorization header 190 includes the "Negotiate" scheme identifier 192, this indicates to server 108 that client 102 supports the Negotiate HTTP authentication scheme but does not support the Nego2 HTTP authentication scheme. In this case, at operation 622, server 108 selects the Negotiate HTTP authentication scheme. Server 108 selects the Negotiate HTTP authentication scheme because the authentication request message 188 includes the scheme "Negotiate" scheme identifier 192. Then at operation 624, server 108 sends an authentication response message 204 to client 102. The response message 204 includes authentication header 206 with a "Negotiate" scheme identifier 208 followed by a blob 210.

FIG. 6 also illustrates an example where server 108, which supports the Nego2 authentication scheme, initiates an HTTP authentication process 600 with client 104. FIG. 6 shows the process from the perspective of server 108. Operations 602-614 are the same as was described above.

However, in this example, at operation 616, server 108 receives authentication request message 196 (shown in FIG. 2) from client 104. Authentication request message 196 includes an authorization header 198 that includes "Nego2" scheme identifier 200 followed by blob 202. The authorization header 198 includes the "Nego2" scheme identifier because client 104 supports the Nego2 authentication scheme and received request message 178 with authentication header 180 that included "Nego2" scheme identifier 184.

At operation 618, server 108 parses the authorization header 198 of authentication request message 196 to determine, at operation 620, what scheme identifier is included. The "Nego2" scheme identifier 200 indicates to server 108 that client 102 supports the Nego2 HTTP authentication scheme. In this case, at operation 626, server 108 selects the Nego2 HTTP authentication scheme. Server 108 selects the Nego2 HTTP authentication scheme because the authentication request message 194 includes the "Nego2" scheme identifier 200. At operation 628, server 108 sends a response message 212 (shown in FIG. 2) to client 104, which includes an authentication header 214 with a "Nego2" scheme identifier 216 followed by a blob 214.

Figure 7:
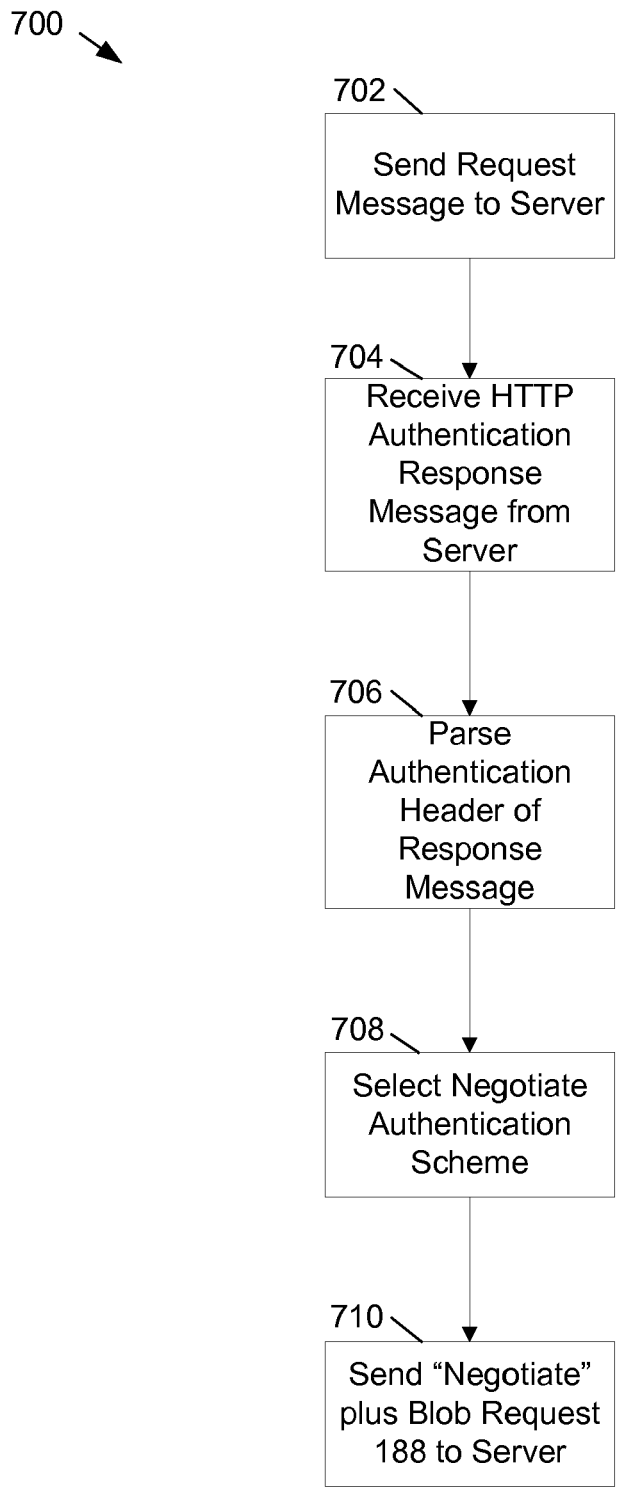
FIG. 7 shows a flow chart illustrating an example of server-initiated authentication from the perspective of a client which supports the Negotiate authentication scheme but not the Nego2 authentication scheme.

FIG. 7 shows a flow chart illustrating HTTP authentication process 600 from FIG. 6 from the perspective of client 102, which does not support the Nego2 authentication scheme. As shown in FIG. 6, server 108 initiates the HTTP authentication process 600 and server 108 supports Nego2. At operation 702, client 102 sends request message (not shown in FIG. 2) to server 108 to access information on server 108. At operation 704, client 102 receives an HTTP authentication response message 178 (shown in FIG. 2) from server 108. The authentication response message 178 includes an authentication header 180 that contains scheme identifier 182 specifying "Negotiate" followed by scheme identifier 184 specifying "Nego2" followed by blob 186. Thus, the authentication response message 178 offers client 102 both the "Negotiate" and "Nego2" authentication schemes. At operation 706, client 102 parses authentication header 180 of the authentication response message. Because server 108 offers both "Negotiate" and "Nego2" but "Nego2" occurs first in authentication header 180, at operation 708, client selects the Negotiate HTTP authentication scheme. Because client 102 supports the Negotiate authentication scheme but not the Nego2 authentication scheme, client 102 does not look for a scheme identifier following the "Negotiate" scheme identifier.

At operation 710, client 102 sends authentication request message 188 (shown in FIG. 2) to server 108. The authentication request message 188 includes an authorization request message header 190 that contains the "Negotiate" scheme identifier 192 followed by blob 194. The "Negotiate" scheme identifier 192 informs server 108 that client 102 has selected the "Negotiate" authentication scheme.

Figure 8:
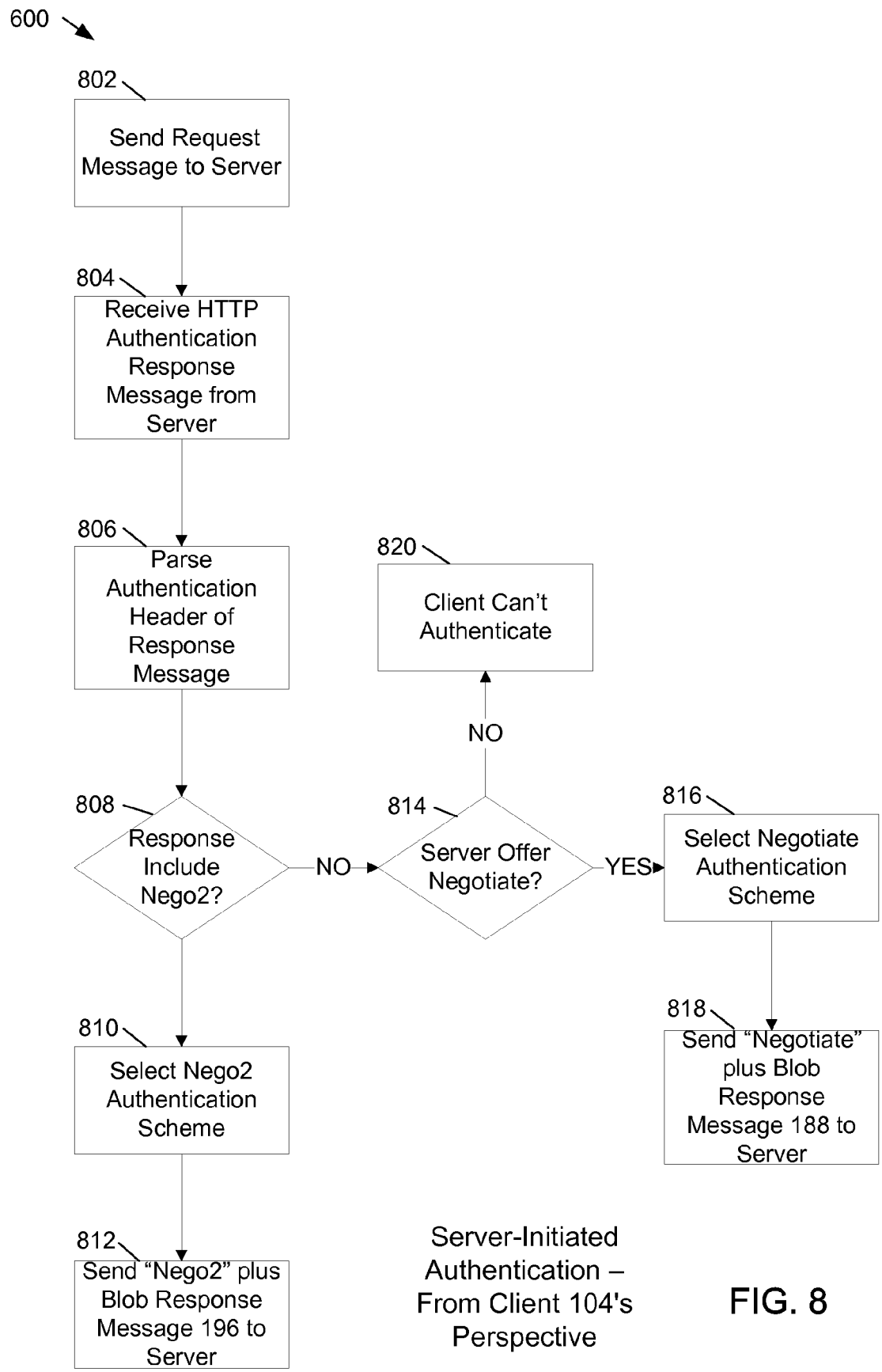
FIG. 8 shows a flow chart illustrating an example of server-initiated authentication from the perspective of a client which supports the Nego2 authentication scheme.

FIG. 8 shows a flow chart illustrating HTTP authentication process 600 from FIG. 6 from the perspective of client 104, which does support the Nego2 authentication scheme. At operation 802, client 104 sends request message (not shown in FIG. 2) to server 108 to access information on server 108. At operation 804, client 104 receives an HTTP authentication response message 178 (shown in FIG. 2) from server 108. The authentication response message 178 includes an authentication header 180 that contains scheme identifier 182 specifying "Negotiate" followed by scheme identifier 184 specifying "Nego2" followed by blob 186. Thus, the authentication response message 176 offers client 104 both the "Negotiate" and "Nego2" authentication schemes. At operation 806, client 104 parses authentication header 180 of authentication response message 178. Because client 104 supports the Nego2 authentication scheme, at operation 808, client 104 determines whether the authentication header 180 includes the scheme identifier "Nego2". When client 104 identifies "Nego2" scheme identifier 184 in authentication header 180, at operation 810, client 104 selects the Nego2 authentication scheme. At operation 812, client 104 sends authentication request message 196 (shown in FIG. 2) to server 108. The authentication request message 196 includes an authorization header 198 that contains "Nego2" scheme identifier 200 followed by blob 202. The "Nego2" scheme identifier 200 informs server 108 that client 104 has selected the "Nego2" authentication scheme.

When parsing authentication header 180 of authentication response message 178 at operation 806, if client 104 cannot identify a "Nego2" scheme identifier in authentication header 180, at operation 814, client 104 determines whether server 108 offers the Negotiate authentication scheme. If client 104 identifies "Negotiate" scheme identifier 182 in authentication header 180, at operation 816 client 104 selects the "Negotiate" authentication scheme. At operation 818, client 104 sends authentication request message 188 to server 108. Authentication request message 188 includes authorization header 190 that contains the "Negotiate" scheme identifier 192 and blob 194.

If at operation 814, client 104 determines that server 108 does not offer the Negotiate authentication scheme, at operation 820 client 104 determines that client 104 cannot authenticate to server 108 and client 104 terminates the authentication process.

Figure 9:
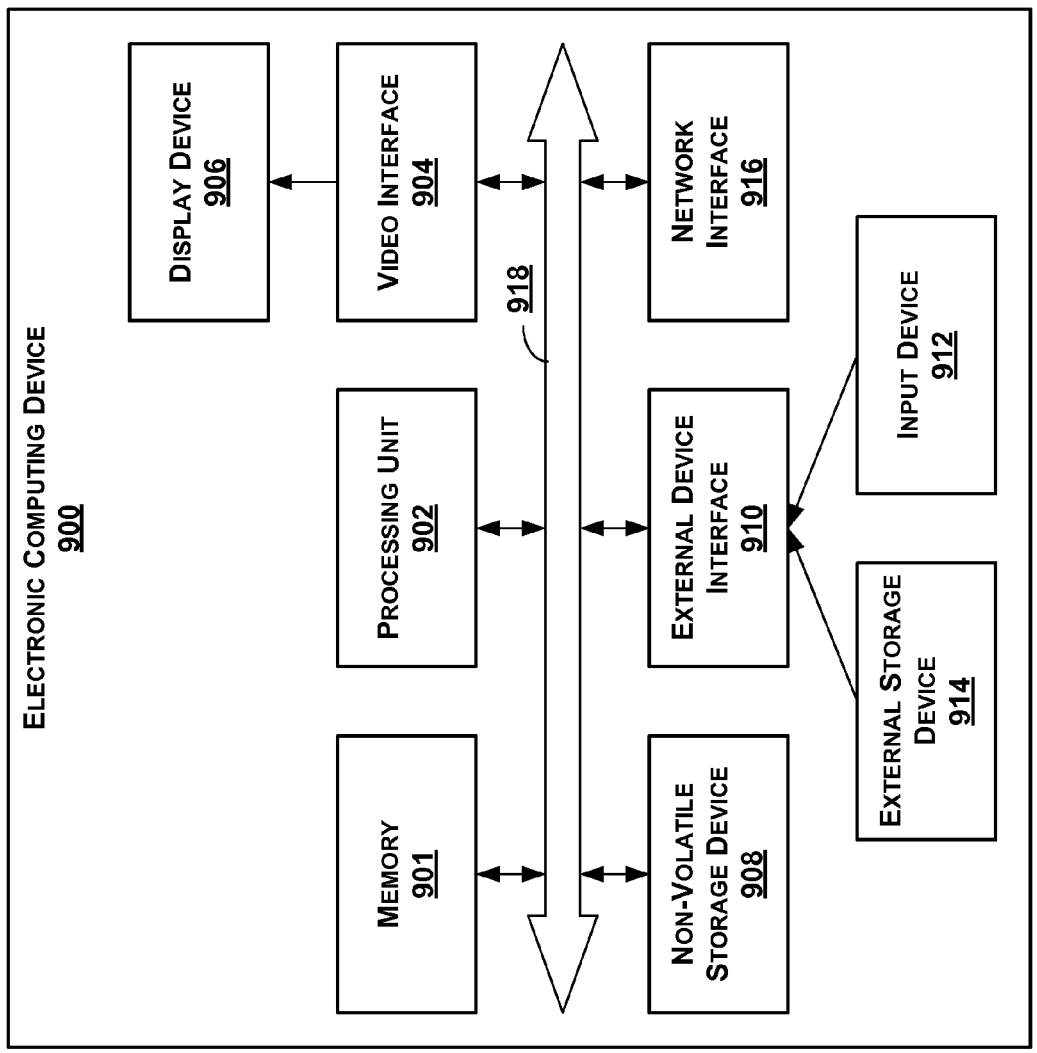
FIG. 9 shows an operating environment for a system that can be used to adaptively select an HTTP authentication scheme.

FIG. 9 is a block diagram illustrating example physical components on an electronic computing device 900. Client systems 102 and 104 and server systems 106 and 108 and/or electronic computing devices within client systems 102 and 104 and/or server systems 106 and 108 may be implemented in the manner of electronic computing device 900. As illustrated in the example of FIG. 9, electronic computing device 900 comprises a memory unit 901. Memory unit 901 is a computer-readable data storage medium that is capable of storing data and instructions. Memory unit 901 may be a variety of different types of computer-readable data storage media including, but not limited to, dynamic random access memory (DRAM), double data rate synchronous dynamic random access memory (DDR SDRAM), reduced latency DRAM, DDR SDRAM, DDR3 SDRAM, Rambus RAM, or other types of computer-readable data storage media.

In addition, electronic computing device 900 comprises a processing unit 902. In a first example, processing unit 902 may execute software instructions that cause processing unit 902 to provide specific functionality. In this first example, processing unit 902 may be implemented as one or more processing cores and/or as one or more separate microprocessors. For instance, in this first example, processing unit 902 may be implemented as one or more Intel Core2 microprocessors. Processing unit 902 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 902 may be implemented as an application specific integrated circuit (ASIC) that provides specific functionality. In a third example, processing unit 902 may provide specific functionality by using an ASIC and by executing software instructions.

Electronic computing device 900 also comprises a video interface 904 that enables a clients system (102 and 104) or a server system (106 and 108) to output video information to display device 906. Display device 906 may be a variety of different types of display devices. For instance, display device 906 may be a cathode-ray tube display, an LCD display panel, a plasma screen display panel, a touch-sensitive display panel, a LED array, or another type of display device.

In addition, electronic device 902 includes a non-volatile storage device 908. Non-volatile storage device 908 is a computer-readable data storage medium that is capable of storage data and/or instructions. Non-volatile storage device 908 may be a variety of different types of different non-volatile storage devices. For example, non-volatile storage device 908 may be one or more hard disk drives, magnetic tape drives, CD-ROM drives, DVD-ROM drives, Blu-Ray disc drives, or other types on non-volatile storage devices.

Electronic computing device 900 also includes an external component interface 910 that enables client systems 102 and 104 and server systems 106 and 108 to communicate with external components. As illustrated in the example of FIG. 9, external component interface 910 communicates with an input device 912 and an external storage device 914. In one implementation of electronic computing device 900, external component interface 910 is a Universal Serial Bus (USB) interface. In other implementations of electronic computing device 900, electronic computing device 900 may include another type of interface that enables electronic computing device 900 to communicate with input device and/or output devices. For instance, electronic computing device 900 may include a PS/2 interface. Input device 912 may be a variety of different types of devices including, but not limited to keyboards, mice, trackballs, stylus input devices, touch pads, touch-sensitive display devices, touch-sensitive display screens, or other types of input devices. External storage device 914 may be a variety of different types of computer-readable data storage media including magnetic tape, flash memory modules, magnetic disk drives, optical disc drives, and other computer-readable data storage media.

In addition, electronic computing device 900 includes a network interface 916 that enables electronic computing device 900 to send data to and receive data. Network interface 916 may be a variety of different types of network interface. For example, network interface 916 may be an Ethernet interface, a token-ring interface, a fiber optic interface, a wireless network interface (e.g. WiFi, WiMax, etc.), or another type of network interface.

Electronic computing device 900 also includes a communications medium 918 that facilitates communication among the various components of electronic computing device 900. Communications medium 918 may comprise one or more different types of communication media including, but not limited to, a PCI bus, a PCI Express bus, an accelerated graphics port (AGP) bus, an Infiniband interconnect, a serial Advanced Attachment (ATA) interconnect, a parallel ATA interconnect, a Fiber Channel interconnect, a USB bus, a Small Computer System Interface (SCSI) interface, or another type of communications medium.

Several computer-readable data storage media are illustrated in the example of FIG. 9 (i.e. memory unit 901, non-volatile storage device 908, and external storage device 914). Together, these computer-readable data storage media may constitute a single logical computer-readable data storage medium. This single logical computer-readable data storage medium may store instructions executable by processing unit 902. Actions described in the above description may result from the execution of the instructions stored on this single logical computer-readable data storage medium. Thus, when this description says that a particular logical module performs a particular action, such a statement may be interpreted to mean that instructions of the software module cause a processing unit, such as processing unit 902, to perform the action.

Through the use of the above embodiments, using SPNEGO with the Nego2 HTTP authentication scheme allows a server to initiate HTTP authentication. When the server initiates HTTP authentication, the Nego2 authentication scheme is used when the server's WWW-Authenticate header contains "Nego2". Otherwise, the "Negotiate" authentication scheme is used.

The various embodiments described above are provided by way of illustration only and should not be construed to limiting. Various modifications and changes that may be made to the embodiments described above without departing from the true spirit and scope of the disclosure.

What is claimed is:

1. A method for selecting a Hypertext Transfer Protocol (HTTP) authentication scheme at a client computer, the method comprising:
    sending a first request message from the client computer to a server computer, the first request message requesting information stored on the server computer;
    receiving an HTTP response message from the server computer, the response message including an HTTP header with a first scheme identifier and a second scheme identifier, the first scheme identifier indicating a first HTTP authentication scheme and the second scheme identifier indicating a second HTTP authentication scheme;
    determining whether the client computer supports the second HTTP authentication scheme;
    in response to determining that the client computer does not support the second HTTP authentication scheme, selecting the first HTTP authentication scheme and sending an HTTP message to the server computer using the first HTTP authentication scheme; and
    in response to determining that the client computer does support the second HTTP authentication scheme, selecting the second HTTP authentication scheme and sending an HTTP message to the server computer using the second HTTP authentication scheme, wherein the first scheme identifier indicates a Negotiate HTTP authentication scheme and the second scheme identifier indicates a Nego2 HTTP authentication scheme.

2. The method of claim 1, wherein the HTTP header further includes a data block immediately following the second scheme identifier in the response message.

3. The method of claim 2, further comprising processing the data block at the client computer when the client computer supports the second HTTP authentication scheme.

4. The method of claim 3, further comprising obtaining, at the client computer, authentication policy information from the data block, the authentication policy information including one or more names of authentication protocols that the server computer accepts.

5. The method of claim 1, wherein sending an HTTP message to the server computer using the first HTTP authentication scheme further comprises including a data block following the first scheme identifier.

6. The method of claim 1, wherein sending an HTTP message to the server computer using the second HTTP authentication scheme further comprises including a data block following the second scheme identifier.

7. The method of claim 1, further comprising in response determining that the client computer does not support the second HTTP authentication scheme, determining whether first HTTP authentication scheme or the second HTTP authentication scheme is the Negotiate HTTP authentication scheme.

8. The method of claim 1, further comprising in response determining that the client computer does support the second HTTP authentication scheme, determining whether the second HTTP authentication scheme is the Nego2 HTTP authentication scheme.

9. A server computer comprising:
    a processing unit; and
    a computer-readable data storage medium, the a computer-readable data storage medium comprising instructions that when executed by the processing unit cause the server computer to:
        receive a first request message from a client computer, the first request message requesting information stored on the server computer;
        in response to receiving the first request message from the client computer, send a first response message to the client computer, the first response message including an HTTP header, the HTTP header including a first scheme identifier and a second scheme identifier, the first scheme identifier indicating a first HTTP authentication scheme and the second scheme identifier indicating a second HTTP authentication scheme;
        receive a second request message from the client computer;
        in response to receiving the second request message from the client computer, determine whether the second request message includes the second scheme identifier;
        in response to determining the second request message includes the second scheme identifier, send a second response message to the client computer, the second response message including the second scheme identifier; and
        in response to determining that the second request message does not include the second scheme identifier, send a second response message to the client computer, the second response message including the first scheme identifier, wherein the first scheme identifier indicates a Negotiate HTTP authentication scheme and the second scheme identifier indicates a Nego2 HTTP authentication scheme.

10. The server computer of claim 9, wherein the HTTP header further includes a data block immediately following the second scheme identifier in the first response message, the data block including authentication policy information.

11. The server computer of claim 10, wherein the data block identifies one or more authentication protocols that the server computer accepts.

12. The server computer of claim 9, wherein the second request message further includes a data block immediately following the second scheme identifier in the second request message.

13. The server computer of claim 12, further comprising instructions that when executed by the processing unit cause the server computer to use the data block to identify authentication protocols supported by the client computer.

14. The server computer of claim 9, further comprising instructions that when executed by the processing unit cause the server computer to include in the second response message a data block immediately following the second scheme identifier in the second response message when the determination is made that the second request message includes the second scheme identifier.

15. The server computer of claim 14, further comprising instructions that when executed by the processing unit cause the server computer to include authentication policy information in the data block.

16. The server computer of claim 9, further comprising instructions that when executed by the processing unit cause the server computer to include in the second response message a data block immediately following the first scheme identifier in the second response message when the determination is made that the second request message includes the first scheme identifier.

17. The server computer of claim 16, further comprising instructions that when executed by the processing unit cause the server computer to include authentication policy information in the data block.

18. A computer-readable data storage medium not consisting of a propagated data signal, the computer-readable data storage medium comprising instructions that, when executed by a processing unit of a server computer, cause the server computer to:

receive a first request message from a client computer, the first request message requesting information stored on the server computer;

in response to the first request message, send a reply message to the client computer, the reply message including an HTTP header, the HTTP header including a first scheme identifier and a second scheme identifier, the first scheme identifier being "Negotiate" and the second scheme identifier being "Nego2", the reply message also including a first data block following the second scheme identifier, the first data block including one or more identifiers of authentication protocols that the server computer accepts;

receive a second request message from the client computer, the second request message including a second HTTP header, the second HTTP header including a third scheme identifier;

determine whether the third scheme identifier matches the first scheme identifier;

in response to determining that the third scheme identifier matches the first scheme identifier, select an HTTP authentication scheme indicated by the first scheme identifier;

determine whether the third scheme identifier matches the second scheme identifier;

in response to determining that the third scheme identifier matches the second scheme identifier, select an HTTP authentication scheme indicated by the second scheme identifier;

in response to determining that the third scheme identifier matches the second scheme identifier, identify a client-accepted authentication protocol by processing a second data block included in the second request message, the client-accepted authentication protocol being an authentication protocol accepted by the client computer; and use the client-accepted authentication protocol to authenticate the client computer at the server computer.

* * * * *

UNITED STATES PATENT AND TRADEMARK OFFICE
CERTIFICATE OF CORRECTION

PATENT NO. : 8,347,356 B2
APPLICATION NO. : 12/415817
DATED : January 1, 2013
INVENTOR(S) : James et al.

Page 1 of 1

It is certified that error appears in the above-identified patent and that said Letters Patent is hereby corrected as shown below:

In the Claims

In Column 14, line 36, In claim 9, after "the" delete "a".

Signed and Sealed this
Third Day of February, 2015

Michelle K. Lee
*Deputy Director of the United States Patent and Trademark Office*